United States Patent [19]

Dussault

[11] 4,441,183

[45] Apr. 3, 1984

[54] APPARATUS FOR TESTING DIGITAL AND ANALOG CIRCUITS

[75] Inventor: Jean A. Dussault, Plainsboro, N.J.

[73] Assignee: Western Electric Company, Inc., New York, N.Y.

[21] Appl. No.: 360,302

[22] Filed: Mar. 22, 1982

[51] Int. Cl.$^3$ .............................................. G06F 31/28
[52] U.S. Cl. .................................... 371/25; 324/73 R; 371/20
[58] Field of Search ....................... 371/20, 25, 26, 37, 371/40; 324/73 R, 73 AT

[56] References Cited

U.S. PATENT DOCUMENTS

| | | | |
|---|---|---|---|
| 3,155,818 | 10/1964 | Goetz | 371/40 |
| 3,562,711 | 2/1971 | Davis et al. | 371/37 |
| 3,976,864 | 8/1976 | Gordan et al. | 371/26 |
| 4,108,358 | 8/1978 | Niemaszyk et al. | 371/20 |
| 4,168,527 | 9/1979 | Winkler | 364/580 |
| 4,192,451 | 3/1980 | Swerling et al. | 371/20 |
| 4,194,113 | 3/1980 | Fulks et al. | 371/20 |
| 4,375,635 | 3/1983 | Leow | 371/25 |

OTHER PUBLICATIONS

Spector, Logic State and Signature Analysis, Electronics, 6/8/78, p. 141.
Raymond, Component-by-Component Testing of Digital Circuit Boards, Computer Design, 4180, p. 129.
Low Cost Portable Logic Analyzer, EDN, 8/20/79, p. 61.
Neil, Designing a Serviceman's Needs Into Microprocessor-Based Systems, Electronics, 3/1/79, p. 122.

Primary Examiner—Charles E. Atkinson
Assistant Examiner—Mark Ungerman
Attorney, Agent, or Firm—M. M. de Picciotto

[57] ABSTRACT

A high-speed, high-resolution testing circuit for both analog and digital circuit packs is described. The testing circuit, which employs data compression techniques, comprises a shift register (22) having an overall length selectively variable under program control, and an arrangement (18) for combining incoming data signals with feedback signals out of predetermined stages of the shift register. The positions of the feedback taps of the variable length shift register are selectively variable under program control (24,26).

7 Claims, 5 Drawing Figures

APPARATUS FOR TESTING DIGITAL AND ANALOG CIRCUITS

TECHNICAL FIELD

The present invention relates to electronic test apparatus and more particularly to an apparatus for testing digital and analog electronic circuits.

BACKGROUND OF THE INVENTION

The testing of electronic circuits usually results in large quantities of data that need to be processed in order to detect and locate faults within the circuit under test. For any given circuit, there is a set of potential faults that may exist when the circuit is tested. Such set of potential faults along with their symptoms, called a dictionary, is a useful aid to the test operator in detecting and diagnosing faulty operation of the circuit. However, dictionaries for electronic digital circuits are often long, somewhat cumbersome to use, and may lead to misclassifications of faults. Therefore, it has been proposed to compress the output data of a circuit under test thus rendering such output signals more manageable. The goal of data compression is to characterize a digital bit stream using as few bits as possible and still preserve sufficient information to achieve detection and/or location of faults within a circuit. Such technique referred to as signature analysis, is described in an article by Ira H. Spector entitled "Logic-State and Signature Analysis Combine for Fast, Easy Testing" in *Electronics*, June 8, 1978, pages 141-145. As shown therein, a linear feedback shift register is fed by the sum modulo two of an incoming digital data stream and a specified fixed set of feedback signals from fixed stages of the register. Although this prior art signature analysis tester operates satisfactorily for its intended purpose, i.e., as a testing apparatus for digital circuits, such a testing apparatus utilizes a fixed length shift register as well as a fixed number of feedback taps. In other words, a certain fixed length shift register is dedicated to the testing apparatus and such apparatus is capable of only testing digital circuits.

Therefore, there exists a need for a flexible testing apparatus applicable to digital and analog circuits wherein a user or operator may selectively modify the physical configuration and processing time and mode of the testing apparatus.

SUMMARY OF THE INVENTION

The foregoing problems are solved in accordance with an embodiment of the invention wherein an apparatus for testing an electronic circuit comprises input means connectable to the electronic circuit under test for receiving data signals characteristic of the circuit; a shift register having a plurality of successive stages defining an overall register length; means for selectively varying the overall register length under program control; means coupling the input means to the shift register including means for combining the data signals with predetermined feedback signals out of the shift register; means for selecting the predetermined feedback signals under program control; and output means coupled to all the stages of the shift register for indicating the status of the circuit under test.

One advantage of the present invention is the ability to achieve a versatile apparatus for testing different types of electronic circuits.

Another advantage of the present invention is the ability to achieve comparable testing resolutions using fewer electronic components and connections.

A further advantage of the present invention is the ability to substantially reduce the time needed to process the test data.

These and other advantages of this invention will appear more fully upon consideration of the various illustrative embodiments now to be described in detail in connection with the accompanying drawings.

DETAILED DESCRIPTION

Figure 1:
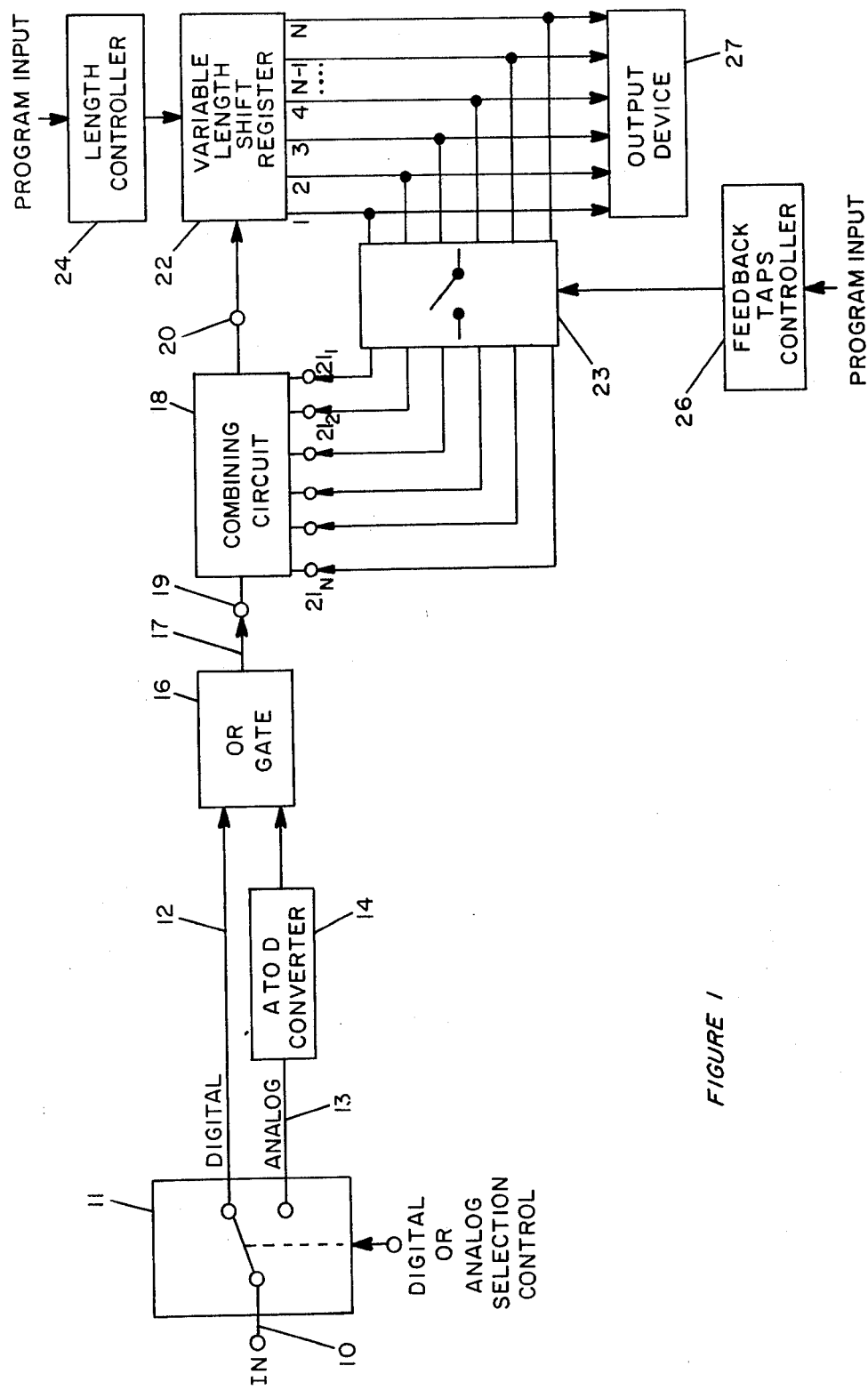
FIG. 1 is a block diagram representation of a testing apparatus in accordance with the present invention.

Referring now to the drawings, FIG. 1 shows a testing apparatus in accordance with an llustrative embodiment of the invention. The apparatus comprises an input lead 10 adapted to receive data signals characteristic of an electronic circuit under test (not shown). Depending whether the circuit under test is a digital circuit or an analog circuit, a selection control switch 11 will respectively direct the incoming data signals along a digital mode path 12 or an analog mode path 13. The latter comprises an analog-to-digital converter 14 which digitizes the incoming analog data signals for further processing. The digital and analog mode paths 12 and 13 are joined by means of a logic OR gate 16 having its output lead 17 connected to a combining circuit 18. For purposes of illustration only, many of the leads in FIG. 1 as well as in the other figures of the drawings such as, input lead 10, mode paths 12 and 13, and output lead 17 are shown as single-wire connections in order not to unnecessarily burden the block diagram representation of the apparatus. Clearly, without departing from the spirit and scope of the present invention, multiwire connections, e.g., busses, may be substituted for these leads.

The combining circuit 18 has a first input terminal 19 connected to the logic OR gate 16, an output terminal 20, and a plurality of second input terminals $21_1, 21_2 \ldots 21_N$. Circuit 18 is of the type that combines the signals present on its input terminals $19, 21_1, 21_2 \ldots 21_N$ and delivers at its output terminal 20 the resultant combined signals. Details of various illustrative embodiments of combining circuit 18 will be described in connection with FIGS. 2 to 4. Data compression is achieved by means of a variable length shift register 22 coupled to combining circuit 18. The output terminals $1, 2, \ldots N$ of the various stages of register 22 are coupled to the set of second input terminals $21_1 \ldots 21_N$ of combining circuit 18 via a feedback switch array 23.

In accordance with an embodiment of the present invention, the overall length of shift register 22 may be selectively varied under the control of length controller 24. The latter, under program control, extends or contracts the overall length of register 22. Moreover, the feedback taps of register 22 to be used in the data compression process are selected by means of feedback taps controller 26. The latter, under program control, selectively energizes any desired combination of switches within feedback switch array 23. An output device 27 is coupled to all the stages of shift register 22. Such output device may be a printer, a CRT display device, or any other well known interface information system capable of indicating the status of the circuit under test.

Figure 2:
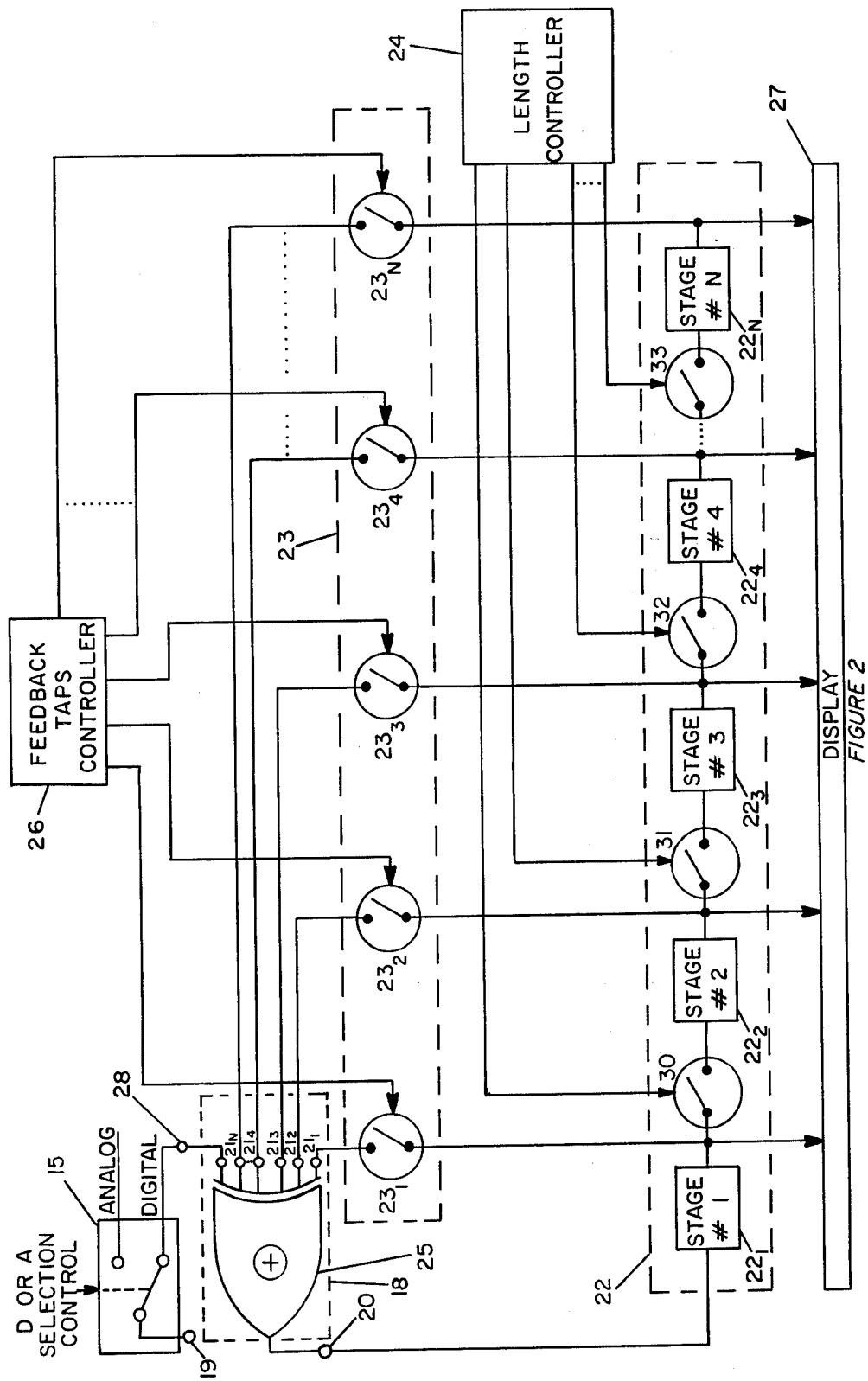
FIG. 2 is one illustrative embodiment of portions of the apparatus of FIG. 1 adapted for testing digital circuits.

FIG. 2 shows one illustrative embodiment of portions of the testing apparatus of FIG. 1 specifically adapted for testing digital circuits wherein the data signals characteristic of the circuits under test are in the form of a digital serial bit stream. In such illustrative embodiment, the combining circuit 18 is an Exclusive-OR logic gate 25 having a first input terminal 28 coupled to the terminal 19 via a mode selection control switch 15. The latter, which is comparable to selection control switch 11 in FIG. 1, will direct the incoming data signals present at terminal 19 to the digital circuit embodiment of the testing apparatus. The embodiment of FIG. 2 is applicable when the incoming digital data signals present at terminal 19 are in the form of serial digital signals. The output of Exclusive-OR gate 25 is coupled through the output terminal 20 to the first stage of variable length shift register 22 which comprises a plurality of bistable successive stages $22_1, 22_2 \ldots 22_N$. Each pair of contiguous stages (i.e. stages No. 1 and 2; 2 and 3; ... ; N-1 and N) is interconnected by means of a selectively energizable electronic switch 30, 31, 32, ... 33. These switches are selectively actuated by length controller 24 in order to expand or contract the overall length of shift register 22. The feedback switch array 23 comprises a plurality of selectively energizable electronic switches $23_1, 23_2, \ldots 23_N$, coupling the output terminals of the various stages $22_1$ to $22_N$ to a second set of inputs of Exclusive-OR gate 25 through the input terminals $21_1$ to $21_N$. Thus, the serial shift register 22 is fed at its first stage $22_1$ with the result of an Exclusive-OR logical operation implemented by gate 25. In other words, the sum modulo two of the incoming data bit stream available at terminal 19 and of outputs from certain register stages which constitute the feedback paths is available at the combining circuit output terminal 20 and coupled to the first stage $22_1$. In this instance, the incoming data bit stream is viewed as a polynomial which is divided by another polynomial characterized by the positions of the feedback taps on the shift register.

In order to illustrate the foregoing, let us assume, for illustration purposes only, that N=4, that feedback taps 1 and 4 are selected, and that the incoming digital signal A(t) on lead 19 is 1000000..0 (15 zeroes). In other words, feedback switches $23_1$ and $23_4$ are closed; feedback switches $23_2$ and $23_3$ are open; and only length switches 30, 31 and 32 are closed. Thus, Exclusive-OR gate 18 performs the following feedback equation:

$$D^4 A(t) + DA(t) + A(t) \tag{1}$$

wherein D is the delay introduced by each stage of the shift register 22. Equation (1) can be rewritten as:

$$A^4 + A + 1 \tag{2}$$

With the output of stage No. 4 having a binary weight equal to zero; that of stages No. 3, 2 and 1, being respectively 1, 2 and 3; and allocating a binary weight equal to 4 to the input signal of stage No. 1, the shift register 22 implements the reverse of equation (2), i.e., $$1 \times A^4 + 1 \times A^3 + 0 \times A^2 + 0 \times A^1 + 1 \times A^0 = A^4 + A^3 + 1 \tag{3}$$

In essence, the shift register 22 divides the incoming digital signal 1000000..0 (15 zeroes) by another digital signal equal to 11001, and the residue 0001 of such division is displayed by output display device 27. In other words, the residue 0001 is the signature of the incoming digital signal.

The length of shift register 22 is selected in accordance with the following criterion. Assume that a circuit under test exhibits a total number of expected faulty conditions equal to F. In response to a set of test vectors applied to such circuit, the latter will generate a plurality of (F+1) circuit conditions. Of these circuit conditions, there are F possible circuit faults and one fault-free circuit operation. Therefore, in accordance with the present invention, the overall length of shift register 22 is selected to be at least equal to $\log_2 (F+1)$ to insure an adequate number of binary register stages capable of distinguishing between all of the combinations of the various possible circuit operations. Preferably, the total number of register stages in shift register 22 is about twice the value of $\log_2 (F+1)$.

Since the number of feedback taps, as well as their respective positions represent the divisor in the above-mentioned polynomial division, the selection of the feedback paths for a circuit under test (after selecting the length of the shift register 22) is based on the maximizing of the total number of possible residues resulting from such a division. There exists a plurality of divisors resulting in a maximum total number of possible residues. For a given circuit under test, the selection of one particular polynomial divisor out of such plurality of divisors is based on previously known error patterns of the circuit under test, i.e., on the manner in which various faults appear at the output terminal of the circuit. Moreover, the foregoing selection is based on the adaptation of the circuit error patterns with the error detecting capabilities of each one of the divisors. Thus, in accordance with an embodiment of the present invention, the respective positions and number of the feedback taps may be changed depending upon the type of circuit being tested. In other words, the present invention enables the selection of an optimum divisor polynomial which is "tailored" to the circuit under test while prior art testing arrangements operate with a fixed number and a fixed positioning of the feedback taps for all the circuits tested. For a given circuit, different length shift registers, as well as, different feedback configurations have been evaluated. Various sets of feedback taps resulted in comparable fault resolution. Of particular interest is a preferred polynomial $A^{16} + A^{12} + A^5 + 1$ which achieves, for the same circuit under test, comparably good and somewhat better fault resolution than for example the well known polynomial $A^{16} + A^{12} + A^9 + A^7 + 1$ which is shown in FIG. 2 of the above-referenced article by I. H. Spector. In other words, by selecting fewer feedback taps than in the prior art arrangement (i.e., by selecting taps No. 5, 12 and 16 instead of taps No. 7, 9, 12 and 16) such a preferred embodiment of the present invention achieves a significant reduction in processing time.

Figure 3:
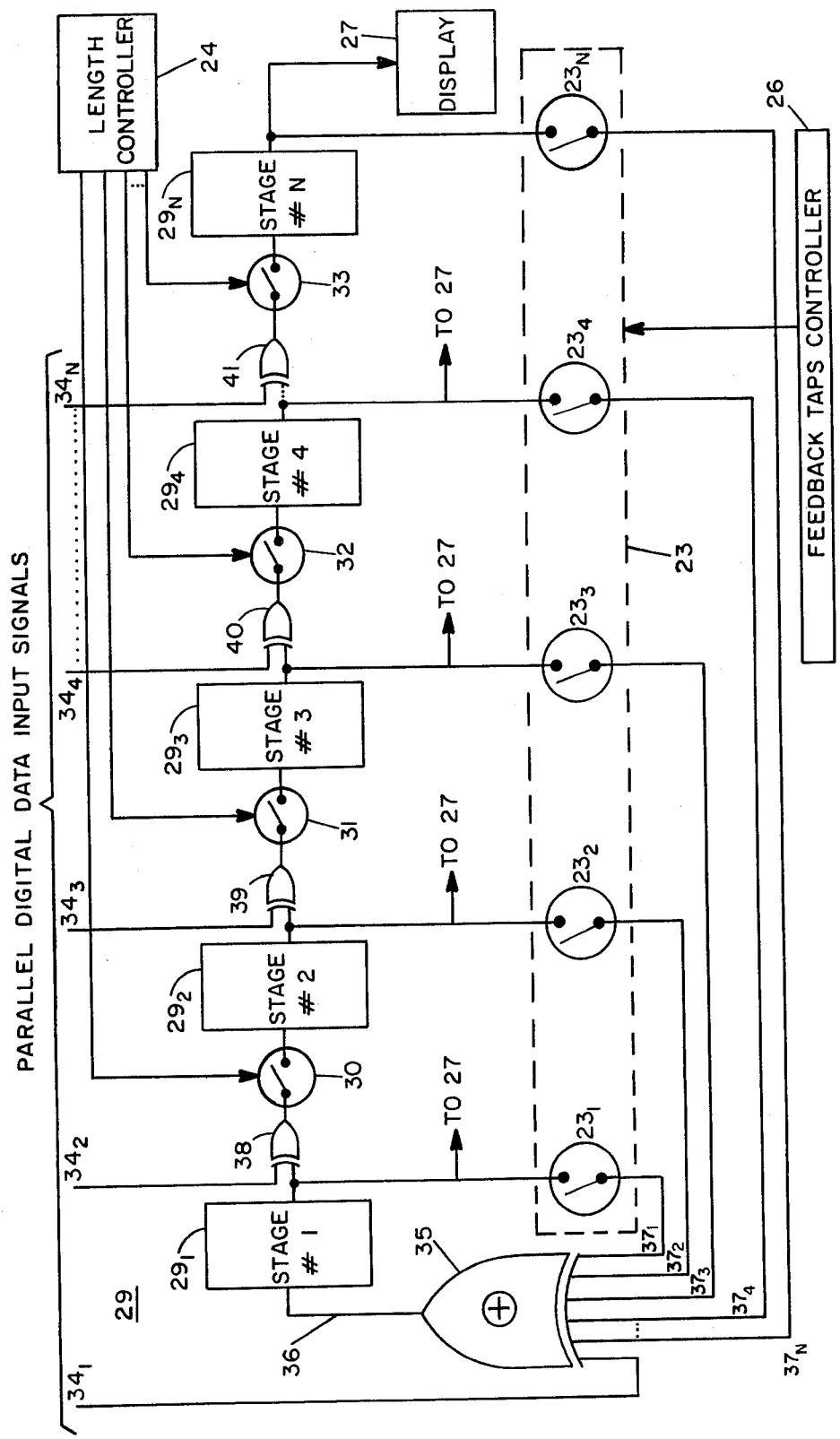
FIG. 3 is an alternative embodiment of portions of the apparatus of FIG. 1 adapted for testing digital circuits.

Shown in FIG. 3 is an alternative embodiment of portions of the apparatus of FIG. 1 specifically adapted for testing digital circuits wherein the data signals characteristic of a circuit under test are in the form of parallel digital data input signals available on input leads $34_1$ to $34_N$. These input leads are respectively coupled to corresponding DIGITAL output portions of a mode selection switch similar to switch 15 of FIG. 2. Various circuit elements shown in FIG. 3 have the same reference numerals as their respective counterparts in the embodiments shown in FIGS. 1 and 2. In such alternative embodiment, the combining circuit comprises a first Exclusive-OR logic gate circuit 35 having a first input terminal coupled to the first input lead $34_1$, and its output terminal 36 coupled to the first stage $29_1$ of a variable length shift register 29. Second input terminals $37_1$ to $37_N$ of Exclusive-OR gate 35 are coupled, via the feedback taps switches $23_1$ to $23_N$, to the output terminals of the respective stages $29_1$ through $29_N$ of variable length shift register 29. The combining circuit further comprises a plurality of second Exclusive-OR logic gates 38, 39, 40, . . . 41 interposed between the successive stages of the shift register and each having an input terminal coupled to the input leads $34_2$ to $34_N$. Thus, each gate, e.g., 39, has one input terminal adapted to receive the parallel digital data input signals, another input terminal coupled to the output terminal of the immediately preceding register stage, e.g. $29_2$, and an output terminal coupled to the input terminal of the next succeeding register stage, e.g. $29_3$, via a length control switch, e.g. 31.

As explained in connection with the serial digital bit stream embodiment of FIG. 2, the embodiment shown in FIG. 3 will also implement a polynomial division of the incoming parallel digital input signals on input leads $34_1$ thru $34_N$ by the divisor polynomial defined by the feedback taps selection.

Figure 4:
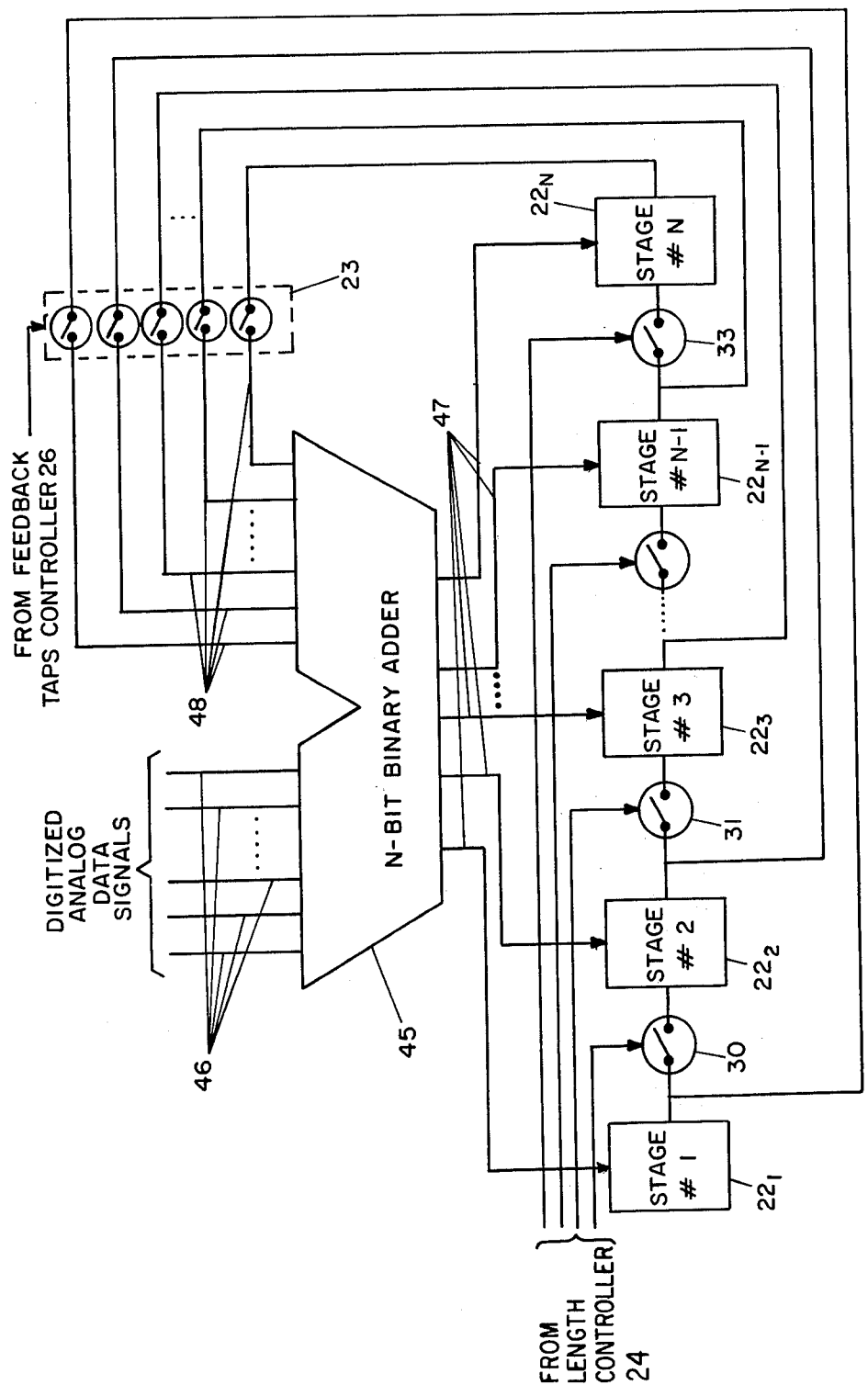
FIG. 4 is an illustrative embodiment of portions of the apparatus of FIG. 1 adapted for testing analog circuits.

FIG. 4 shows an illustrative embodiment of portions of the apparatus of FIG. 1 adapted for the testing of analog circuits. As in digital systems, the operation of an analog circuit can be determined by the correlation between the actual and expected behaviors when a test is applied. For a digital circuit, every discrete bit in an output sequence therefrom must precisely match the expected output sequence in order to confirm fault free operation. However, because of the non-discrete nature of analog signals, small variations from the expected values may still constitute good signals. Therefore, any attempt to compress analog signals should account for such small variations. The herein proposed scheme for analog data compression comprises sampling and digitization of the analog signal, and compression using arithmetic compression.

Arithmetic compression makes use of simple accumulation techniques to produce arithmetic signatures of the digitized signals. An arithmetic signature of a single stream of bits is the arithmetic modular sum of a sequence of vectors of equal length, the concatenation of which forms the complete bit stream. In other words, the stream is broken into vectors of equal length which are then accumulated. Sampling is the process of observing the analog signal for a small period of time at well defined intervals. Digitization simply assigns a binary value to the amplitude of the signal when it is sampled. A sufficiently high sampling rate followed by digitization will result in a very accurate binary characterization of the analog waveform. This may be achieved by analog-to-digital converter 14 of FIG. 1. The resulting bit stream can then be compressed like any other bit stream. Because acceptable variations will occur, the compressed versions (or signature) of similar signals should be similar. Arithmetic compression will in fact produce similar results for similar signals as long as the cumulative worst case deviations of the good circuits are within reasonable bounds. For example, if the amplitude of the output waveform of the circuit under test is within 5% of the expected value, then the compressed version will be within 5% of the target signature.

In accordance with the present invention, analog data compression is achieved by means of a combining circuit including a binary adder 45 having a first plurality of input terminals 46 adapted to receive the digitized analog data signals from, for example, the ANALOG output portion of a mode selection switch comparable to switch 15 of FIG. 2. Each output terminal of a plurality of output terminals 47 of the binary adder 45 is coupled to a corresponding stage 1 through N of variable shift register 22. The latter, as described in connection with FIG. 2, comprises a plurality of stages $22_1$ to $22_N$ interconnected by means of length control switches 30, 31, . . . 33, each selectively energizable under the control of a variable length controller (not shown). Such length controller would be comparable to controller 24 of FIG. 2. A feedback switch array 23, under the control of a feedback taps controller (not shown, but comparable to feedback taps controller 26 of FIG. 2), selectively couples the output terminals of the register stages $22_1$ to $22_N$ to a second plurality of input terminals 48 of the binary adder 45. A condition for achieving analog data compression is that the length of the full binary adder 45 be equal to the length of shift register 22. In other words, a selection of a predetermined number of stages within the shift register 22 will also determine the number of feedback switches $23_1$ to $23_N$ to be used.

In the operation of this illustrative embodiment, each incoming digitized analog input signal available on input terminals 46 is accumulated in the binary adder 45 in combination with the feedback tap signals available on terminals 48, and the result of such accumulation is fed to respective stages of shift register 22. The selection of the length of shift register 22 is based on criteria explained in connection with the other above-described embodiments.

Figure 5:
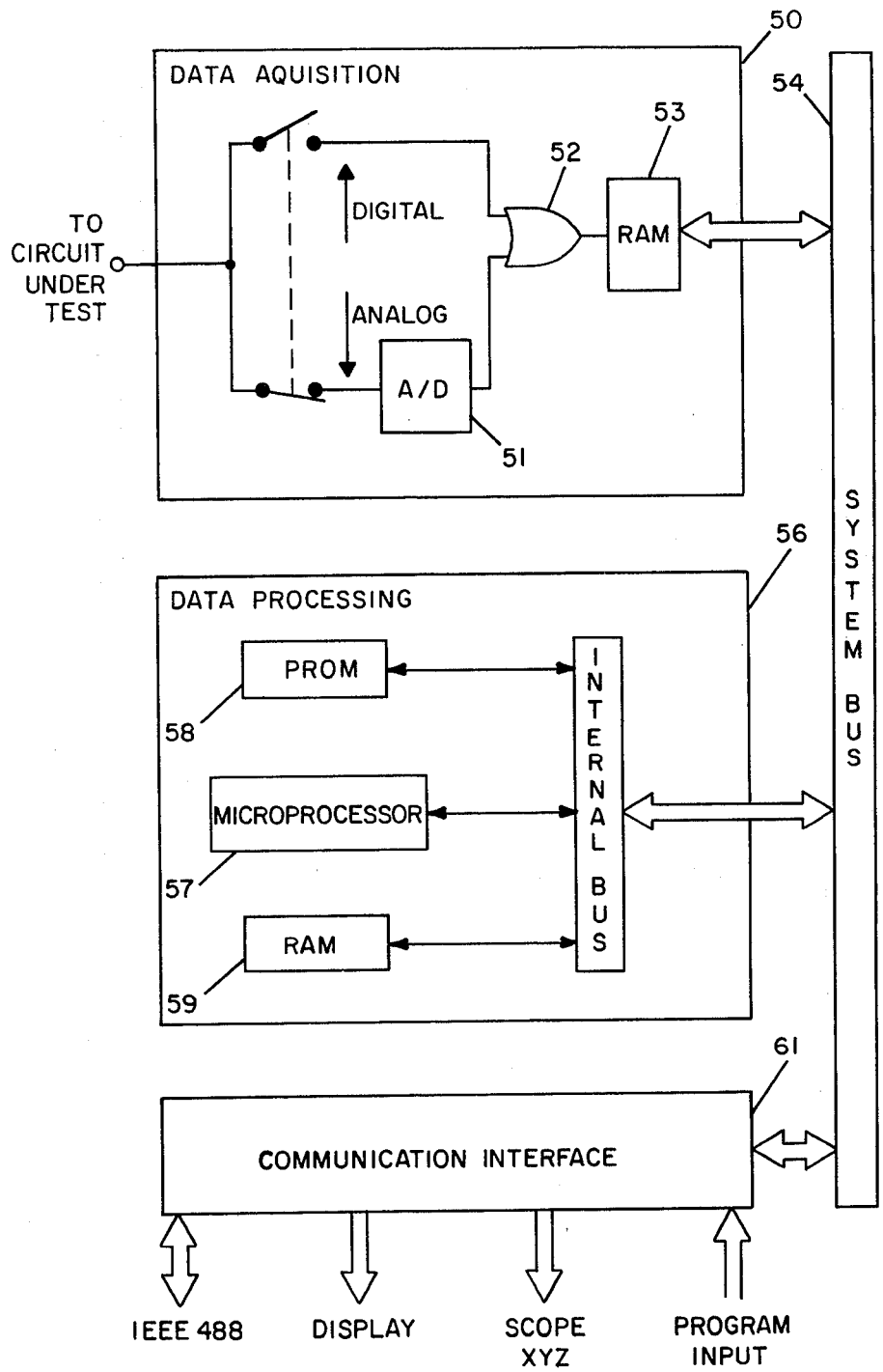
FIG. 5 is a block diagram implementation of a flexible data compression-based testing apparatus in accordance with the present invention.

A block diagram implementation of the above-described flexible data compression-based testing apparatus is shown in FIG. 5. Data acquisition section 50 is responsible for gathering analog and digital signals. In the digital mode the module simply stores the stream of bit coming out from the circuit under test. In the analog mode, the signal is sampled in real time and digitized by analog-to-digital converter 51. The digitized information is loaded, via OR gate 52, in a local memory 53 for further processing later on. The local memory 53 may not be necessary depending upon the speed of digital testing since the analog portion will probably be constrained by the relatively slower analog-to-digital (A/D) converter 51.

The data processing section 56 performs simple algorithms on the information gathered by the data acquisition section 50 and available via bus 54. Its basic functions are to control the acquisition of data and perform data compression. Because of the flexibility of the processor, this can be achieved in a variety of ways. A microprocessor 57 is best suited to perform arithmetic compression. The microprocessor is controlled by a Program Input terminal, e.g. keyboard, or a simple set of switches that selects the program stored in a programmable read only memory (PROM) 58, and access different signatures stored in the scratch pad random access memory (RAM) 59 for display purpose. A communication interface 61 includes the Program Input terminal and may include a digital display for signatures, an oscilloscope output useful to display memory content, and/or a type IEEE 488 bus capable of interfacing with other standard instruments or controllers.

In the above-described illustrative embodiments relating to the testing of digital circuits, the testing apparatus is synchronized by means of a clock signal generated by the digital circuit under test. In the case of the embodiment relating to the testing of analog circuits, the testing apparatus is synchronized by means of a clock signal in phase with the sampling rate of the analog-to-digital converter.

It is to be understood that the embodiments described herein are merely illustrative of the principles of the invention. Various modifications may be made thereto by persons skilled in the art without departing from the spirit and scope of the invention.

What is claimed is:

1. Apparatus for testing an electronic circuit comprising:
   input means connectable to the electronic circuit under test for receiving data signals characteristic of said circuit;
   a shift register having a plurality of successive stages defining an overall register length;
   means for selectively varying said overall register length under program control;
   means coupling said input means to said shift register including means for combining said data signals with predetermined feedback signals out of said shift register;
   means for selecting said predetermined feedback signals under program control; and
   output means coupled to all the stages of said shift register for indicating the status of said circuit under test.

2. Apparatus according to claim 1, wherein the data signals are serial digital signals and the combining means comprise an Exclusive-OR logic gate having an output terminal coupled to the first stage of said shift register, one input terminal adapted to receive said serial digital signals, and a plurality of second input terminals each coupled to a stage of said shift register via said means for selecting the feedback signals.

3. Apparatus according to claim 1, wherein the data signals are parallel digital signals available on a plurality of input leads, the combining means comprising:
   a first Exclusive-OR logic gate having an output terminal coupled to the first stage of said shift register, a first input terminal coupled to the first lead of said input leads, and a plurality of second input terminals each coupled to a stage of said shift register via said means for selecting the feedback signals; and
   a plurality of second Exclusive-OR logic gates interposed between the successive stages of said shift register, each of said second logic gates having one input terminal coupled to the output terminal of a register stage, another input terminal adapted to receive the parallel digital signals from the remaining input leads, and an output terminal coupled to the input terminal of the next succeeding register stage.

4. Apparatus according to claim 1, wherein the data signals are analog signals; the coupling means further comprise an analog-to-digital converter having an input terminal coupled to said input means and an output terminal; and the combining means comprise a binary adder having at least a first input terminal coupled to the converter output terminal, at least a second input terminal coupled to a stage of said shift register via said means for selecting the predetermined feedback signals, and at least one output terminal coupled to an input terminal of a register stage, said binary adder having a length selectively variable under program control.

5. Apparatus according to claim 4, wherein the length of said binary adder is equal to the length of said register.

6. Apparatus according to claim 1, wherein said means for selectively varying the overall register length comprises a plurality of electronic switches interposed between the successive stages of the shift register, said switches being selectively energizable under program control.

7. Apparatus according to claim 1, wherein said means for selecting the predetermined feedback signals comprise a plurality of electronic switches connected between the output terminal of each stage of the shift register and said coupling means, said switches being selectively energizable under program control.

* * * * *